J. R. AYERS.
PEANUT PLANTER.
APPLICATION FILED OCT. 10, 1910.
988,063.
Patented Mar. 28, 1911.
2 SHEETS—SHEET 2.
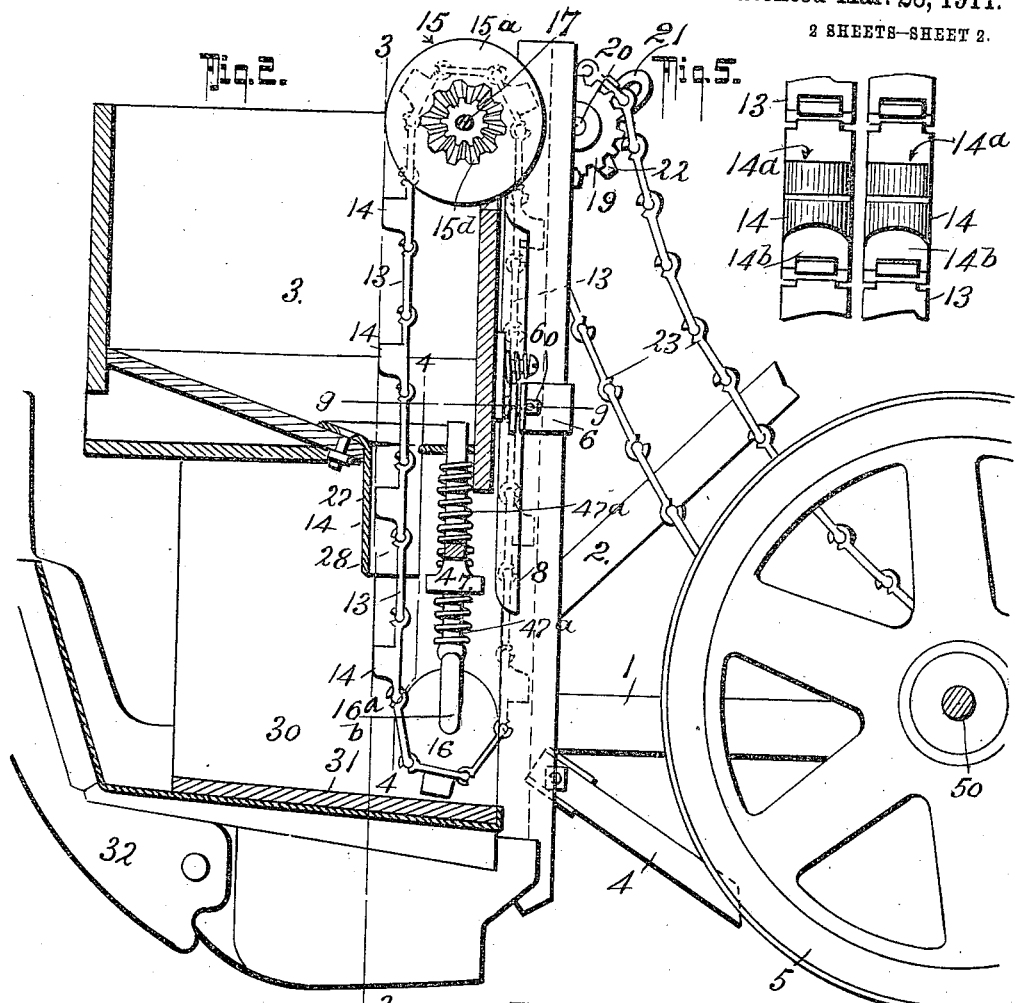
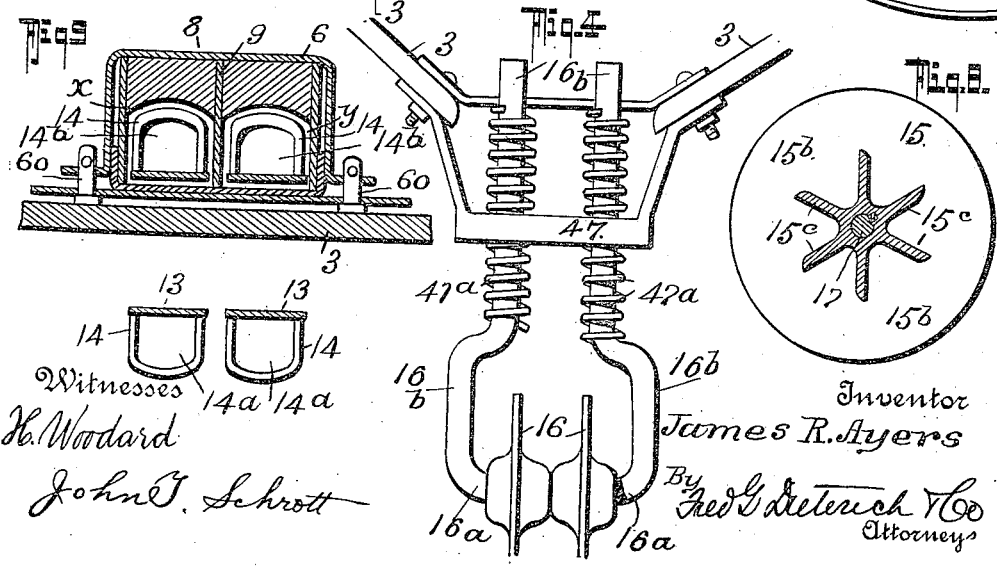
Witnesses
H. Woodard
John T. Schrott
Inventor
James R. Ayers
By Fred G. Dieterich & Co
Attorneys

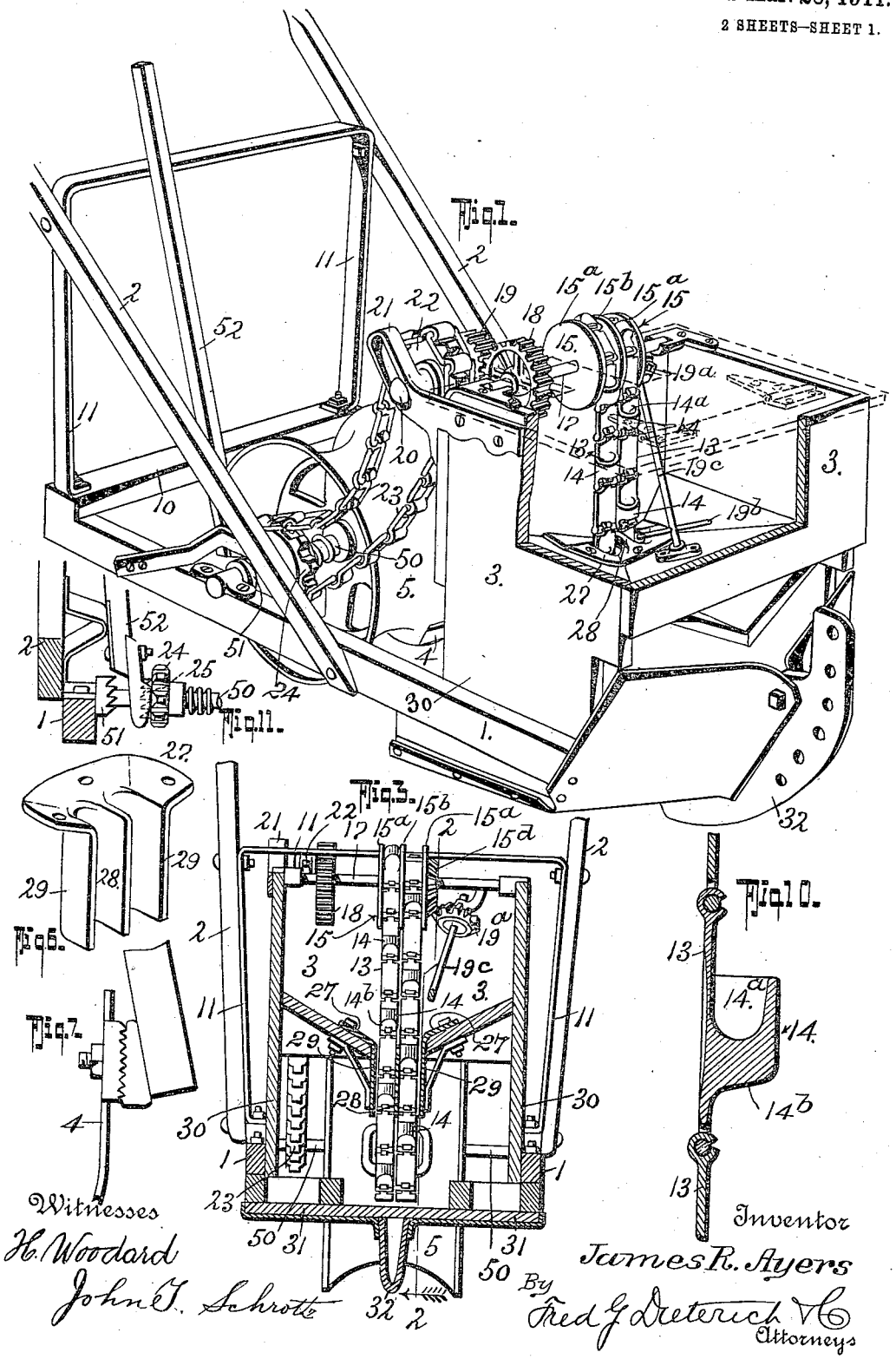

UNITED STATES PATENT OFFICE.

JAMES R. AYERS, OF PETERSBURG, VIRGINIA.

PEANUT-PLANTER.

988,063.

Specification of Letters Patent.   Patented Mar. 28, 1911.

Application filed October 10, 1910.   Serial No. 586,371.

*To all whom it may concern:*

Be it known that I, JAMES R. AYERS, residing at Petersburg, in the county of Dinwiddie and State of Virginia, have invented a new and Improved Peanut-Planter, of which the following is a specification.

My invention has for its object the improvement of peanut planters, particularly of that type disclosed in my Patent No. 346,976 of August 10, 1886, and 635,635 of October 24, 1899, and to adapt the machines shown in my patents referred to, to better, and more easily handle light and bulky seeds, such as for instance, unshelled peanuts.

My present invention, in its generic features, embodies an improved arrangement of the seed carrying devices especially designed for allowing more time for filling the cups or seed conveyers while preserving the same speed of the conveyers, and whereby to enable the correct and uniform spacing and dropping of the seed in the furrow.

In its more complete nature, my present construction of peanut planter includes a special arrangement of a plurality of conveying belts and other combinations and arrangement of parts, all of which will be hereinafter fully explained, specifically pointed out in the appended claims and illustrated in the accompanying drawings, in which:—

Figure 1, is a perspective view of my improved peanut planter, parts of the seed hopper being broken away to the better disclose the internal mechanism, the hopper cover being indicated in dotted lines. Fig. 2, is a vertical, longitudinal section that shows the operating parts of the machine, and is taken substantially on the line 2—2 on Fig. 3, looking in the direction of the arrow. Fig. 3, is a transverse section thereof (on a reduced scale) taken on the line 3—3 on Fig. 2. Fig. 4, is a vertical section taken on the line 4—4 on Fig. 2. Fig. 5, is a detail view of a modified arrangement of the conveying belts. Fig. 6, is a detail view of the partition nozzle or belt guide hereinafter referred to. Fig. 7, is a detail view of one of the covering drags. Fig. 8, is a cross section of the upper combined conveyer chain supporting and drive wheel. Fig. 9, is a detail horizontal section on the line 9—9 on Fig. 2. Fig. 10, is a sectional view of one of the chain cups. Fig. 11, is a detail view of the clutch device on the driving wheel shaft.

The framing of my present form of planter includes the longitudinal side beams 1—1, the rear cross beam 10, the vertical yoke or standard 11 mounted on the said beam 10, the handles 2—2 secured to the beams 1—1 and the standard 11.

The front end of beams 1—1 are fastened to the lower ends of the pendent side portions 30 of the hopper 3, which are joined to a cross bottom member 31 under which is mounted the soil opener 32 located in advance of the covering roller 5, and the adjustable drag or scraper members 4, all of the said parts being of a conventional arrangement and form no essential feature of my present invention.

The hopper 3 has its bottom dished to discharge toward a feeding nozzle 27 in the nature of a casting formed with a central and two end flanges 28 and 29 and is arranged in the discharge opening in the hopper and serves to guide the seeds into the cups of the carriers presently again referred to, the flanges of said nozzle also acting to separate the endless conveyer belts as best shown in Fig. 3.

8 designates a chute having a vertical groove to allow for the convenient insertion of a partition 9 that divides the chute into longitudinal compartments $x$—$y$ through each of which a feeding belt travels, and the lower end of the chute terminates in a single discharging throat or delivery member. As is most clearly shown in Fig. 9 the chute 8 is supported by a yoke 6 suitably secured, for example, by studs 60, to the back wall of the hopper. The endless conveyer mechanism, the construction of which forms the essential feature of my present invention, comprises two chain belts 13—13, as shown, and these are arranged side by side so that they have upwardly movable stretches that operate within the hopper 3 and downwardly moving stretches operating within the two vertical compartments of the chute 8 located on the opposite sides of a central partition 9.

The chain belts 13 are each composed of detachably connectible links, some of which are plain and others of which have seed carriers or cups 14, it being understood from the drawing that in ascending, the cups as they rise up through the nozzle guide 27, take up the seeds and as they pass over the upper or supporting wheel 15 they descend with their contents into the compartments $x$—$y$ of chute 8.

In the preferred arrangement the cups on the two chains are alternately disposed, that is, a cup on one chain is in line with a plain link of the other chain, it being obvious that a greater distance between the droppings is effected by having a cup link arranged after two or more plain links.

That end of each of the cups 14 that passes upwardly through the hopper has a pocket $14^a$ and it is these pockets that gather the seed and carry the same over, the supporting wheel 15, and the said pockets, as they begin their descent into the chute outside of the hopper drop the seeds onto the back of a preceding cup, the latter now serving as a support for the seeds as they descend in the said chute to the single discharge opening in the lower end thereof.

The drive and supporting pulley 15 is mounted on a shaft 17, suitably journaled on the upper rear edge of the hopper, and on the said shaft 17 is a gear 18 that meshes with a pinion 19 on a stub shaft 20 adjustably and rearwardly held in a diagonally slotted bracket 21 mounted on the upper rear edge of the hopper, as is clearly shown in Fig. 1.

Shaft 19 carries a sprocket gear 22 over which takes a sprocket chain 23 that passes over a sprocket wheel 24 on a clutch hub 25 slidably mounted on the shaft 50 of the covering roller and adapted to be moved into engagement with a clutch member 51 fixed on the said shaft 50, a suitable lever 52 being connected thereto for operating the same.

The object in detachably mounting the gear 19 and shaft 20 as stated is to provide for sustaining a larger or smaller size of said gear 19—19 as desired.

The conveyer belts 13 have their lower portions take around tension pulleys 16 journaled on stub shafts $16^a$ that extend inwardly from a pair of rods $16^b$ that take through a yoke or saddle member 47 mounted on the hopper frame. $47^a$ designate buffer springs on the rods $16^b$.

To facilitate the proper guidance of the chains 13, their links are longitudinally grooved on their inner face to hug the peripheral edge of the said pulleys, it being understood the springs $47^a$ serve to maintain the pulleys 16 at their lowermost position and thereby keep the chain belts under constant tension.

The chain driving and supporting wheel 15 comprises two end disks $15^a$, an intermediate disk $15^b$ and radial tooth portions $15^c$ for engaging the chain links, it being understood the said wheel 15 is a double drive wheel, each part thereof accommodating one of the chains 13 and the toothed portions $15^c$—$15^c$ of the wheel 15 are so spaced relatively to the chains 13 to permit the opposite edges of each link of the chains to contact with two adjacent ones of the said teeth, see Fig. 8.

It will be noticed in Figs. 1, 2 and 3 of the drawings, the two chains are relatively positioned so a cup on the link of one chain alternates with an open link on the other chain, such arrangement of the chains providing for planting the seeds first from a cup on one chain and then from a cup on the other chain, the dropping operation being uniform.

When it is desired that a plurality of seed droppings be effected at each delivery, the chains 13 are adjusted to bring their cups in alinement as in Fig. 5, and such adjustment is accomplished by simply pulling one of the chains forwardly on its bearings to cause it to slip over the beveled edges of the teeth $15^c$, this being readily effected since in the practical arrangement the yieldable mounting of the lower bearing pulleys for the chains provides for sufficient slack on the chains to permit the slipping of the chains forwardly over the driving wheel teeth $15^c$. Back pull of the chains is prevented by the straight edges of the said teeth $15^c$.

At one end the wheel 15 has a bevel pinion $15^d$ with which meshes a bevel pinion $19^a$ on the upper end of a shaft $19^c$ mounted in the hopper and having a stirrer arm or blade $19^b$ for agitating and stirring the contents of the hopper to facilitate a proper outfeed of the said contents.

The stirrer devices referred to may be omitted since they form no essential feature of my present invention.

Operation: The operation of the machine is best explained as follows: When the machine moves forward, motion is transmitted from the covering roller shaft to the gearing that actuates the wheel 15 and thereby imparting motion to the chain or conveyer belts. The peanuts are carried by the buckets on the downward stretch of the chains within the chute 8 and they are dropped therefrom into the furrow through the outlet or throat member of the chute as the chains pass under the lower pulleys 16, the seeds being dropped into furrow before the nearest cup up the next or adjacent belt has approached its lowermost position, such arrangement of parts providing for causing the several carriers to successively discharge their contents into the furrow without necessitating any increase in the speed of the belts on the driven roller.

It is apparent that by adjusting the seed carriers or cups on the various belts so they do not have a staggered relation but arranged side by side as shown in Fig. 5 an increased number of peanuts or seeds can be deposited at one point, and by inserting as many cup bearing links into each chain as may be necessary or desirable, the distance between the successive outlets or discharge points in the furrow may be varied at will.

From the foregoing, taken in connection with the drawing, the complete construction, the operation and the general advantages will be readily apparent, it being understood that slight modifications and various changes in the details of construction shown and described may be made without departing from my invention or the scope of the appended claims.

What I claim is:—

1. A peanut planter, the following elements in combination, a hopper having a divided throat at the bottom, a chute coöperatively connected with the hopper, a centrally divided chain drive pulley located above the hopper and the chute, yieldably mounted chain drive pulleys below the hopper and the chute, a pair of endless carrier chains that take around the divided drive pulley and the yieldably mounted pulleys, said chains each having carrier cups for traveling up through the divided throat of the hopper and down through the divided chute.

2. In a peanut planter, the following elements in combination, a hopper having a divided throat at the bottom, a chute coöperatively connected with the hopper, a centrally divided chain drive pulley located above the hopper and the chute, yieldably mounted chain drive pulleys below the hopper and the chute, a pair of endless carrier chains that take around the divided drive pulley and the yieldably mounted pulleys, said chains each having carrier cups for traveling up through the divided throat of the hopper and down through the divided chute, said chains being longitudinally shiftable on their pulley bearings relatively to each other.

3. In a peanut planter, a hopper, a chute outside the hopper, having a plurality of passages, a pair of endless conveyer chains mounted on the hopper to travel up through the hopper and down through the chute, and a feeding throat mounted in a bottom opening in the hopper, having a plurality of walls that form guides for the chains as they pass therethrough and having a web by which said throat is secured in the hopper bottom.

4. In a device of the character described, a frame, a supporting wheel therefor, a hopper carried by the frame, a chute detachably secured at one side of the hopper, a detachable longitudinal partition dividing the same into a plurality of compartments having a single outlet, a plurality of chain conveyers traveling through said hopper and the respective compartments of the chute, each of said conveyers being provided with seed cups, and means for driving said conveyers including a pulley rotated from the supporting wheel, the pulley being divided by a partition wall into a plurality of passage ways over each of which one of the conveyers travels.

5. In a device of the character described, a frame, a supporting wheel therefor, a hopper carried by the frame, a chute detachably secured at one side of the hopper, a longitudinal partition dividing the same into a plurality of chain conveyers traveling through said hopper and the respective compartments of the chute, each of said conveyers being provided with seed cups, and means for driving said conveyers including a plurality of pulleys rotated from the supporting wheel, one of said pulleys being divided by a partition wall into a plurality of passage ways over each of which one of the conveyers travels, and the other of said pulleys being yieldably mounted.

6. In a device of the character described, a frame, a supporting wheel therefor, a hopper carried by the frame, a chute secured at the rear of said hopper, a plurality of chain conveyers arranged side by side and carrying a plurality of seed cups, said conveyers being adjustable relatively to each other, a partitioned pulley supporting both of said chain conveyers at their upper extremities, a single spring-pressed pulley supporting said conveyers at their lower extremities, and means actuated from the supporting roller for moving the conveyers.

7. In a peanut planter, the combination of a wheeled frame, a hopper mounted thereon, a chute having a single discharge at the lower end and a plurality of vertically extending compartments, a partitioned pulley mounted on the upper end of the hopper to coöperate with the chute compartments; a plurality of endless conveyer chains supported on the pulley, one stretch of which passes up through the hopper and the other stretch of which passes down the chute compartments, buckets on the chain for lifting and depositing the seed, a guide pulley for the lower end of each chain, tension devices for the said guide pulleys and means for driving the chains supporting pulley, said partition pulley including a plurality of radial chain engaging teeth having one edge of each beveled to permit the chain being slipped past said teeth.

8. In a peanut planter, a conveyer composed of a plurality of like endless chains, each formed of detachably connected links, some of the said links carrying seed lifting buckets, means for mounting and driving the conveyer, said means including a divided chain supporting driving pulley having radial chain engaging teeth.

9. In a peanut planter, a conveyer mechanism, comprising a pair of endless conveyer chains, yieldable pulley bearings for engaging one portion of the said chains, a partition pulley bearing for engaging the other portions of the said chain, said partition pulley bearing having radial chain engaging teeth, one of the outer edges of the teeth being beveled, to permit said conveyer chains to be slipped over said teeth in one direction and prevent said chains being slipped over said teeth in an opposite direction.

10. In a peanut planter, a hopper having an opening in its bottom, a throatway having a flange secured to the bottom of said hopper on the inside of the same and having a partitioned throat portion projected through the opening in said hopper bottom to form two parallel channels, a shaft journaled in bearings on the top of said hopper, a single chain pulley on said shaft, two endless bucket chains taking over said pulley, one of said chains passing through one channel of said throatway and the other chain passing through the other channel of said throatway, and a divided chute secured to the outside of said hopper through which said chains pass, said chute having a common discharge opening for the material from both chains, and means for driving said shaft.

11. In a peanut planter, a hopper having an opening in its bottom, a throatway having a flange secured to the bottom of said hopper on the inside of the same and having a partitioned throat portion projected through the opening of said hopper bottom to form two parallel channels, a shaft journaled in bearings on the top of said hopper, a single chain pulley on said shaft, two endless bucket chains taking over said pulley, one of said chains passing through one channel of said throatway and the other chain passing through the other channel of said throatway, and a divided chute secured to the outside of said hopper through which said chains pass, said chute having a common discharge opening for the material from both chains, means for driving said shaft, a single pulley having side flanges and over which both of said endless chains pass, and means secured beneath said hopper in which said last named pulley is yieldably mounted.

12. In a peanut planter, a hopper having an opening in its bottom, a throatway having a flange secured to the bottom of said hopper on the inside of the same and having a partitioned throatway projected through the opening in said hopper bottom to form two parallel channels, a shaft journaled in bearings on top of said hopper, a single chain pulley on said shaft, two endless bucket chains taking over said pulley, one of said chains passing through one channel of said throatway, and the other chain passing through the other channel of said throatway, a divided chute secured to the outside of said hopper through which said chains pass, said chute having a common discharge opening for the material from both chains, means for driving said shaft, a stirring rod mounted in said hopper, adjacent to said chains and gear connections between said stirring rod and said shaft for imparting motion to said stirring rod, said stirring rod having a transverse stirring member near the bottom that projects over said flange of said throatway.

JAMES R. AYERS.

Witnesses:
ANNIE C. SCOTT,
M. W. BECKWITH.

Copies of this patent may be obtained for five cents each, by addressing the "Commissioner of Patents Washington, D. C."